Sept. 10, 1929.   W. E. WENDT   1,727,421
ELECTRICAL APPARATUS
Filed Oct. 31, 1927
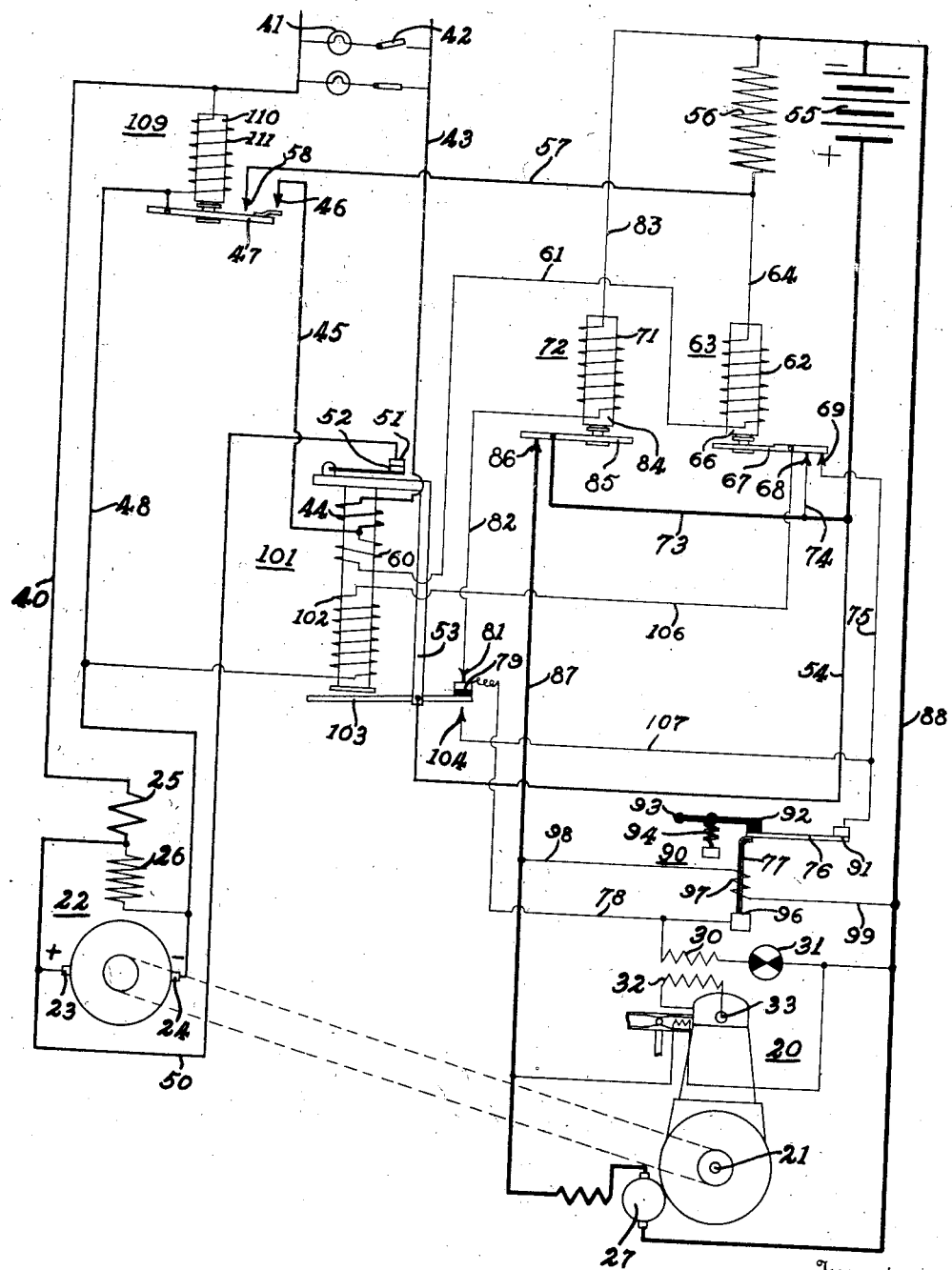
Inventor
Wesley E. Wendt
By Spencer, Hardman, and Jieley
Attorney Patented Sept. 10, 1929.

1,727,421

UNITED STATES PATENT OFFICE.

WESLEY E. WENDT, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed October 31, 1927. Serial No. 229,953.

The present invention relates to electrical generating systems including a prime mover, such as an internal combustion engine, electrical apparatus which is adapted to supply current to a generating circuit, and a source of current such as a battery for rendering the prime mover operable to drive the electrical apparatus.

In this type of generating system, it is the practice to provide means for disconnecting the battery from the electrical engine cranking apparatus when the engine functions abnormally in order to prevent the depletion of the battery. One of the objects of the present invention is to provide an improved system in which the control for the means is more positive in operation particularly when the engine functions abnormally after it has been operating normally, as for example when the fuel supply for the engine is exhausted while the engine is operating.

Further objects and advantages of the present invention will be apparent from the following description, reference being had to the accompanying drawing, wherein a preferred form of the present invention is clearly shown.

The figure of the drawing is a wiring diagram illustrating the present invention.

In the drawing 20 designates a prime mover having a shaft 21 which drives a relatively high voltage generator 22 having main brushes 23 and 24 connected with the armature of the generator, and having a series field winding 25 and a shunt field winding 26.

For the purpose of illustrating one form of the present invention there is shown a relatively low voltage series motor 27, which is normally disconnected from the engine, but which may be connected therewith for cranking the same. As various devices for automatically connecting and disconnecting the starting motor are well-known to those skilled in the art, illustration thereof is deemed unnecessary. One form of mechanical connection which may be used with this invention is described and claimed in the copending application of Frank F. Starr, Serial No. 47,717, filed August 3, 1925.

The engine ignition apparatus comprises an ignition coil primary 30, an ignition timer 31, and an ignition coil secondary 32 which is connected with the engine spark plug 33.

Two generating circuits are provided, namely, a relatively high voltage work circuit and a relatively low voltage battery charging circuit. The relatively high voltage work circuit, which is supplied by the generator 22, includes the series field 25, a wire 40, translating devices 41, which are individually controlled by switches 42, wire 43, coil 44, and a wire 45, contact 46, pivoted contact 47, and wire 48. The battery charging circuit includes the wire 50, contact 51, movable contact 52, magnet frame 53, wire 54, battery 55, battery charging resistance 56, a wire 57, contacts 58 and 47, and wire 48.

To start the engine automatically in response to a demand for current in the work circuit, one of the switches 42 is closed, thereby causing current to flow from the low voltage battery 53 through the following sentinel circuit: battery 55, wire 54, frame 53, contacts 52 and 51, wire 50, field 25, wire 40, lamp 41, switch 42, wire 43, coil 44, coil 60, wire 61, coil 62 of a starting switch relay 63, wire 64, and resistance 56. It will be noted that the low voltage battery 55 is connected across the high voltage work circuit containing the high voltage translating device 41, and since such translating devices are relatively high resistance, the current flow in the circuit is small. The coil 62 of relay 63, however, is wound so that it will attract its armature 66 when the translating circuit is closed. Therefore when there is a demand in the translating or work circuit this relay will be actuated. The armature 66 actuates a contact 67 which is arranged to engage the contacts 68 and 69. When contact 67 engages contacts 68 and 69 a magnet coil 71 of a starting switch 72 is energized over the following circuit: battery 55, wire 54, wires 73 and 74, contacts 68, 67 and 69, wire 75, movable contact 76, thermostat 77, wire 78, movable contact 79, contact 81, wire 82, coil 71, and wire 83 to the opposite side of the battery. When coil 71 is energized the armature 84 will be attracted and will cause a movable contact 85 to engage a contact 86 to complete the following cranking circuit to the motor 27: wires 54 and 73, contact 85, contact 86, wire 87, series motor 27 and wire 88 to the opposite side of the battery.

The engagement of contact 67 with contacts 68 and 69 of relay 63 will establish the "starting" ignition circuit for the engine. This circuit branches from wire 78 whence the current flows to the primary ignition coil 30, timer 31 and wire 88 and is in parallel with coil 71 of starting switch 72. Thus the engine will be started by supplying ignition thereto and by cranking the engine by the starting motor 27.

If, after connecting the starting motor 27 with the battery 53 for cranking the engine, and the latter should not become self operating within a predetermined length of time, depletion of the battery is prevented by disconnecting the motor from the battery by a cranking cut-out 90. This cranking cut-out includes the contacts 76 and 77 which form a part of the circuit to the starting switch coil 71. The contact 76 includes a leaf spring fixed at 91 and is engaged by an insulating lever 92 which lever is pivoted at 93. This lever is urged downwardly by a spring 94. Downward movement of the lever 89 is normally restrained by its engagement with the upper end of the thermostatic bi-metal blade 77 which is fixed at 96. The blade 77 is in heat-receiving relation to a heating coil 97 and this coil is connected across the battery terminals, one end of said coil being connected by a wire 98 to the wire 87 and the other end thereof being connected by a wire 99 with the wire 88. Thus it is apparent that when current is supplied to the starting motor the heating coil 97 is energized, and if the cranking of the engine should continue for an abnormal period, the bi-metallic blade 77 will be heated sufficiently to cause the upper end thereof to bend toward the left, as viewed in the drawing, until the said end of the blade 77 moves past the contact 76. When this occurs, the lever 92 moves downwardly and causes contact 76 to separate from contact 77 to thus interrupt the flow of current through the starting switch magnet coil 68 whereby contact 82 will be separated from contact 83 to thus interrupt the cranking circuit, while at the same time interrupting the ignition circuit.

During normal operation, the engine becomes self operative before the cranking circuit is interrupted. However, it is desirable to interrupt the cranking circuit after the engine is self operative and this is accomplished by a stop-cranking relay 101 which includes the coils 44 and 60, and a coil 102. The coil 102 is arranged to attract an armature contact 103 to cause the contact 79 to be separated from contact 81 and contact 103 will engage a contact 104. It will be noted that contact 79 is insulated from contact 103.

The coil 102 is connected across the terminals of the generator 22 by wire 50, contacts 51 and 52, frame 53, wires 54 and 74, contacts 68 and 67 of starting switch relay 63, a wire 106, coil 102, and wire 48 to the opposite side of the generator. When the generator voltage reaches a certain value (less than normal), the coil 102 will be energized sufficiently to attract the armature contact 103 whereby the circuit of the starting switch magnet 71 will be interrupted at 81—79 to thus interrupt the cranking circuit of the motor 27 and the cranking cut-out circuit by separating contact 85 from contact 86. A "running" ignition circuit is established by the engagement of contact 103 with contact 104 as follows: battery 55, wire 54, frame 53, contacts 103 and 104, which latter contact is connected with the wire 75 by a wire 107. Wire 75 is connected with primary ignition coil 30. Thus when contact 67, of the starting switch relay 63, separates from contacts 68 and 69, as will hereinafter be explained, ignition is maintained by the stop-cranking relay 101.

It is to be understood that when relay 101 operates, the generator 22 is not up to full voltage, but is only at a low voltage state, and, when the generator does attain substantially its full relatively high voltage load switch 109 will be brought into operation. This load switch includes the movable contact 47 and actuating armature 110 and a coil 111. This coil is connected across the generator 22 by wire 40 on one side of the generator and by wire 48 on the other side of the generator; and when the voltage across the terminals of the generator attain a certain value, coil 111 will be energized sufficiently to attract the armature 110 to cause contact 47 to engage contacts 46 and 58 to thus complete the generating circuits including the battery and the translating devices.

Contact 47 is arranged to engage contact 46 an instant sooner than it engages contact 58 in order to prevent a reversal in a current in coil 62 which would be the case if current were permitted to flow first through contact 58 and wire 57. When contact 47 engages contact 58 the coil 62 of relay 61, and coil 60 of relay 101, will be short-circuited since the resistance of wire 57 is less than the resistance offered by wire 64, coil 62, wire 61, coil 60, and wire 45, this latter circuit being now connected in parallel with wire 57. The armature 60 of starting switch relay will now drop to cause contact 67 to separate from contacts 68 and 69 to thus interrupt the circuit to the coil 102 of stop-cranking relay 101 and to interrupt the "starting" ignition circuit. At this time, however, the coil 44, which is in the translating circuit will be energized and will maintain the contact 103 in engagement with contact 104 whereby the "running" ignition circuit is maintained. It is apparent that the entire system is now under the control of coil 111 of relay 109, and coil 44 of relay 101. As long as current is in demand in the translating circuit, the coil 44 will maintain the ignition circuit closed, but as soon as the demand ceases, the coil 44 will be de-energized and the contact 103 will be separated from contact 104 to interrupt the ignition circuit and thereby stop the engine and generator 22.

Should the engine function abnormally after it has been operating, as for example when the fuel supply is exhausted, the speed of the engine and generator will decrease and consequently there will be a drop in voltage across the generator terminal. The armature 110 of relay 109 will fall out to thus cause contact 47 to separate from contacts 46 and 58. When this occurs, the shorting circuit (wire 57) will be interrupted and the circuit, including coils 62 and 60 will be reestablished. When this occurs the coil 102 is again connected across the terminals of the generator by the engagement of contact 67 of relay 63 with contact 68. The sentinel circuit, including the battery 55, wire 54, frame 53, contacts 52 and 51, wire 50, field 25, wire 40, lamp 41, switch 42, wire 43, coils 44 and 60, wire 61, coil 62, wire 64 and resistance 56, is energized. The coil 60 is wound to create a magnetic effect opposite to that created by coil 44 whereby the armature contact 103 will drop out to interrupt the "running" ignition circuit at 104, and cause contact 79 to engage contact 81. The starting switch coil 71 will be connected then with the battery to reestablish the cranking circuit at 85—86. The motor will then crank the engine during the interval necessary for heating the blade 77 of the cranking cut-out 90 enough to cause contact 76 to separate from contact 77 to thus interrupt the "starting" ignition circuit and the circuit for coil 71.

It will be apparent that sufficient turns must be provided in coil 44 of relay 101 to provide sufficient ampere-turns to maintain the armature 103 attracted when only a small current consuming device is connected to the work circuit. Current from the battery flowing through the coil 44 and current from the generator 22 flowing through the coil 102 while the generator is being driven by the motor 27 would be sufficient to maintain the armature 103 attracted if the coil 60 were omitted and the relay 101 was not delicately adjusted. If the armature 103 would not drop out, the ignition circuit would be maintained and if the contacts of the timer 31 were in engagement, the coil 30 would burn. However, through my improvement, the armature 103 will always drop out since coil 60 opposes coils 44 and 102 and by virtue of this no delicate adjustment is necessary for relay 101.

By arranging the system as herein shown and described, separate contacts are not necessary for the coil 60 since it is arranged to be controlled by short-circuiting and removing such shorting circuit by contacts which are necessary to perform other functions of the system.

While the form of embodiment of the invention as herein disclosed, constitutes a preferred form, it is to be understood that other forms might be adopted, all coming within the scope of the claims which follow.

What is claimed is as follows:

1. An electrical generating system comprising in combination, an internal combustion engine; a battery; electrical apparatus for cranking the engine and for supplying current; an engine cranking circuit connecting the battery and electrical apparatus; an engine control device; means for establishing the cranking circuit and for rendering said device operative; means for interrupting the cranking circuit in case of fruitless cranking of the engine; means for maintaining the control device operative including a coil, said coil normally tending to maintain the cranking circuit interrupting means inoperative as long as there is a demand for current from the electrical apparatus altho the engine is inoperative, and a second coil rendered operable when the engine functions abnormally for opposing said first coil for rendering the interrupting means operative.

2. An electrical generating system comprising in combination, an internal combustion engine; a battery; electrical apparatus for cranking the engine and for supplying current; an engine cranking circuit connecting the battery and electrical apparatus; an engine control device; means for establishing the cranking circuit and for rendering said device operative; means for interrupting the cranking circuit in case of fruitless cranking of the engine; means in series with the generating circuit for maintaining the control device operative including a coil, said coil normally tending to maintain the cranking circuit interrupting means inoperative as long as there is a demand for current from the electrical apparatus altho the engine is inoperative, and a second coil rendered operable when the engine functions abnormally for opposing said first coil for rendering the interrupting means operative.

3. An electrical generating system comprising in combination, an internal combustion engine; a battery; electrical apparatus for cranking the engine and for supplying current; an engine cranking circuit connecting the battery and electrical apparatus; an engine control device; means for establishing the cranking circuit and for rendering said device operative; means for interrupting the cranking circuit in case of fruitless cranking of the engine; means for maintaining the control device operative including a coil, said coil normally tending to maintain the cranking circuit interrupting means inoperative as long as there is a demand for current from the electrical apparatus altho the engine is inoperative, means responsive to engine operation for rendering said coil operative, and a second coil rendered operable when the engine functions abnormally for opposing said first coil for rendering the interrupting means operative.

4. An electrical generating system comprising in combination, an internal combustion engine; a battery; electrical apparatus for cranking the engine and for supplying current; an engine cranking circuit connecting the battery and electrical apparatus; an engine control device; means for establishing the cranking circuit and for rendering said device operative; means for interrupting the cranking circuit in case of fruitless cranking of the engine; means in series with the generating circuit for maintaining the control device operative including a coil, said coil normally tending to maintain the cranking circuit interrupting means inoperative as long as there is a demand for current from the electrical apparatus altho the engine is inoperative, means responsive to engine operation for rendering said coil operative, and a second coil rendered operable when the engine functions abnormally for opposing said first coil for rendering the interrupting means operative.

5. An electrical generating system comprising in combination, an internal combustion engine; a battery; electrical apparatus for cranking the engine and for supplying current; an engine cranking circuit adapted to connect the battery and electrical apparatus; an engine control device; means for establishing the cranking circuit and for rendering the control device operative; a sentinel circuit for rendering said means operable, a plurality of coils arranged in said circuit and adapted to produce opposite magnetic effects; means responsive to engine operation for rendering said first means inoperative, and for rendering one of said coils ineffective, the other of said coils being arranged to maintain the control device operative, said engine responsive means being adapted to cause said opposing coils to be energized in the event of abnormal operation of said engine; and means operable to prevent fruitless cranking of the engine, said last means being rendered operative when said coils are energized.

6. An electrical generating system comprising in combination, an internal combustion engine; a battery; electrical apparatus for cranking the engine and for supplying current; an engine cranking circuit adapted to connect the battery and electrical apparatus; a generating circuit; an engine control device; means for establishing the cranking circuit and for rendering the control device operative; a sentinel circuit for rendering said means operable, said sentinel circuit including a plurality of coils arranged to produce opposite magnetic effects, one of said coils being arranged in the generating circuit; means responsive to engine operation for rendering the first means inoperative and for rendering the other of said opposing coils ineffective, the coil in the generating circuit then being adapted to maintain the control device operative, said engine responsive means being adapted to render the said other coil operative in the event of abnormal operation of the engine; and means operable to prevent fruitless cranking of the engine, said last means being rendered operable when said coils are energized.

7. An electrical generating system comprising in combination, an internal combustion engine; a battery; electrical apparatus for cranking the engine and for supplying current; an engine cranking circuit adapted to connect the battery and electrical apparatus; an engine control device; means for establishing the cranking circuit and for rendering the control device operative; a sentinel circuit for rendering said means operable, a plurality of coils arranged in said circuit and adapted to produce opposite magnetic effects; means responsive to engine operation for rendering said first means inoperative and for rendering one of said coils ineffective, the other of said coils being arranged to maintain the control device operative, said engine responsive means being adapted to cause said opposing coils to be energized in the event of abnormal operation of said engine, said coils when energized being adapted to establish the cranking circuit; and means rendered operable when the cranking circuit is established to prevent fruitless cranking of the engine.

In testimony whereof I hereto affix my signature.

WESLEY E. WENDT.